(12) United States Patent
Orr

(10) Patent No.: US 7,686,006 B1
(45) Date of Patent: Mar. 30, 2010

(54) AIR SYSTEM ATTACHMENT ON PAINTBALL MARKER

(75) Inventor: Jeffrey George Orr, Corona, CA (US)

(73) Assignee: JT Sports, LLC, Bentonville, AR (US)

( * ) Notice: Subject to any disclaimer, the term of this patent is extended or adjusted under 35 U.S.C. 154(b) by 0 days.

(21) Appl. No.: 12/378,082

(22) Filed: Feb. 11, 2009

Related U.S. Application Data

(63) Continuation of application No. 11/606,302, filed on Nov. 28, 2006, which is a continuation of application No. 10/815,553, filed on Apr. 1, 2004, now abandoned.

(60) Provisional application No. 60/459,671, filed on Apr. 2, 2003.

(51) Int. Cl.
*F41B 11/06* (2006.01)
(52) U.S. Cl. .............. 124/80; 124/56; 124/74
(58) Field of Classification Search .......... 124/71–77
See application file for complete search history.

(56) References Cited

U.S. PATENT DOCUMENTS

| | | | |
|---|---|---|---|
| 43,573 A | 7/1864 | Crane ................. 15/104.18 |
| 57,846 A | 9/1866 | Bausman ............. 15/104.16 |
| 143,139 A | 9/1873 | Gould ................. 15/104.16 |
| 645,932 A | 3/1900 | Ferrant ................... 89/125 |
| 1,167,178 A | 1/1916 | Hill ......................... 124/56 |
| 1,343,127 A | 6/1920 | Hallinan .................. 124/54 |
| 1,743,576 A | 1/1930 | Smith ...................... 124/72 |
| 2,453,683 A | 11/1948 | Caldow ..................... 42/70 |
| 2,484,267 A | 10/1949 | Bower .................... 15/242 |
| 2,550,887 A | 5/1951 | Tratsch ..................... 124/1 |
| 2,563,720 A | 8/1951 | Guisasola ................. 42/70 |
| 2,568,432 A | 9/1951 | Cook ..................... 124/13 |
| 2,834,332 A | 5/1958 | Guthrie .................. 124/13 |
| 2,845,055 A | 7/1958 | Collins et al. .......... 124/11 |
| 3,089,476 A | 5/1963 | Wolverton .............. 124/11 |
| 3,220,733 A * | 11/1965 | Saleeby ................ 473/335 |
| 3,240,200 A | 3/1966 | Jones .................... 124/11 |
| 3,273,553 A | 9/1966 | Doyle ..................... 124/3 |
| 3,374,708 A | 3/1968 | Wall et al. ................ 89/1 |
| 3,494,344 A | 2/1970 | Vadas et al. ............ 124/11 |
| 3,548,708 A | 12/1970 | Hubigh ................ 89/1.818 |
| 3,572,310 A | 3/1971 | Chiba .................... 124/11 |
| 3,695,246 A | 10/1972 | Filippi et al. ........... 124/11 |
| 3,818,887 A | 6/1974 | Akiyama et al. ....... 124/15 |

(Continued)

FOREIGN PATENT DOCUMENTS

DE 19518884 6/1994

(Continued)

*Primary Examiner*—Troy Chambers
(74) *Attorney, Agent, or Firm*—Keisling Pieper & Scott, PLC; Meredith K. Lowry

(57) ABSTRACT

An attachment for securing an air tank or canister to a paintball marker, the attachment comprises a first attachment piece formed on the paintball. The first attachment piece has a body portion by means of which it is secured to the paintball marker and a fastening portion. A second attachment piece is provided and has a body portion by means of which it is secured to the air tank and a fastening portion. The fastening portion of the second attachment piece is configured to releasably engage with the fastening portion of the first attachment piece to secure the air tank to the paintball marker.

6 Claims, 2 Drawing Sheets

U.S. PATENT DOCUMENTS

| | | | |
|---|---|---|---|
| 3,899,845 A | 8/1975 | Wild et al. | 42/69 |
| D237,678 S | 11/1975 | Spencer | D7/179 |
| 3,923,033 A | 12/1975 | Laporte et al. | 124/8 |
| 4,066,000 A | 1/1978 | Rostocil | 89/198 |
| 4,133,128 A | 1/1979 | Brush | 42/70 R |
| 4,207,799 A | 6/1980 | Tocco | 89/196 |
| 4,282,795 A | 8/1981 | Beretta | 89/148 |
| 4,347,679 A | 9/1982 | Grunig et al. | 42/84 |
| 4,362,145 A | 12/1982 | Stelcher | 124/32 |
| 4,516,273 A | 5/1985 | Gregory et al. | 2/2 |
| 4,555,083 A * | 11/1985 | Carter | 248/313 |
| 4,589,327 A | 5/1986 | Smith | 89/148 |
| 4,602,608 A | 7/1986 | Lacam et al. | 124/74 |
| 4,648,191 A * | 3/1987 | Goff et al. | 42/75.02 |
| 4,679,487 A | 7/1987 | Houseman | 89/140 |
| 4,694,815 A | 9/1987 | Hung | 124/27 |
| 4,770,153 A | 9/1988 | Edelman | 124/72 |
| 4,779,245 A | 10/1988 | Chelminski | 367/144 |
| 4,785,930 A | 11/1988 | Fischer et al. | 206/3 |
| 4,819,609 A | 4/1989 | Tippmann | 124/72 |
| 4,899,717 A | 2/1990 | Rutten et al. | 124/67 |
| 4,936,282 A | 6/1990 | Dobbins et al. | 124/74 |
| 4,940,138 A | 7/1990 | Hornstein | 206/218 |
| D321,325 S | 11/1991 | Petrus | D9/435 |
| 5,063,905 A | 11/1991 | Farrell | 124/72 |
| 5,068,990 A | 12/1991 | Marzocco | 42/70.04 |
| 5,078,118 A | 1/1992 | Perrone | 124/74 |
| 5,149,898 A | 9/1992 | Chesnut et al. | 42/69.01 |
| 5,228,427 A | 7/1993 | Gardner, Jr. | 124/71 |
| 5,251,533 A | 10/1993 | Layton | 89/142 |
| 5,261,384 A | 11/1993 | Hu | 124/66 |
| 5,280,778 A | 1/1994 | Kotsiopoulos | 124/73 |
| 5,282,454 A | 2/1994 | Bell et al. | 124/49 |
| 5,293,708 A | 3/1994 | Strayer et al. | 42/75.03 |
| 5,349,939 A | 9/1994 | Perrone | 124/76 |
| 5,363,834 A | 11/1994 | Stuchlik | 124/76 |
| 5,370,105 A | 12/1994 | Firman | 124/56 |
| 5,413,083 A | 5/1995 | Jones | 124/32 |
| 5,462,042 A | 10/1995 | Grenwell | 124/76 |
| D366,514 S | 1/1996 | Hochstrate et al. | D22/108 |
| 5,479,710 A * | 1/1996 | Aston | 30/182 |
| 5,503,137 A | 4/1996 | Fusco | 124/72 |
| 5,596,162 A | 1/1997 | Burns | 89/128 |
| 5,613,483 A | 3/1997 | Lukas et al. | 124/73 |
| 5,634,456 A | 6/1997 | Perrone | 124/76 |
| 5,635,663 A | 6/1997 | Krieger et al. | 89/142 |
| 5,718,074 A | 2/1998 | Keeney | 42/69.03 |
| D393,115 S | 3/1998 | Bell et al. | D32/35 |
| 5,727,538 A | 3/1998 | Ellis | 124/77 |
| 5,736,720 A | 4/1998 | Bell et al. | 235/1 |
| 5,755,213 A | 5/1998 | Gardner, Jr. et al. | 124/73 |
| 5,760,328 A | 6/1998 | Robbins | 89/129.02 |
| 5,799,434 A | 9/1998 | Krieger et al. | 42/69.03 |
| 5,816,232 A | 10/1998 | Bell | 124/51.1 |
| 5,868,637 A | 2/1999 | Poxon | 473/469 |
| 5,878,736 A | 3/1999 | Lotuaco, III | 124/71 |
| 5,881,707 A | 3/1999 | Gardner, Jr. | 124/77 |
| 5,890,479 A | 4/1999 | Morin | 124/31 |
| 5,913,303 A | 6/1999 | Kotsiopoulos | 124/31 |
| 5,927,261 A * | 7/1999 | Bofill | 124/80 |
| 5,957,119 A | 9/1999 | Perry et al. | 124/73 |
| 5,967,133 A | 10/1999 | Gardner, Jr. | 124/77 |
| 6,003,504 A | 12/1999 | Rice et al. | 124/73 |
| 6,015,058 A | 1/2000 | Parks | 220/229 |
| 6,035,843 A | 3/2000 | Smith et al. | 124/77 |
| 6,048,280 A | 4/2000 | Palmer et al. | 473/416 |
| 6,055,975 A | 5/2000 | Gallagher et al. | 124/50 |
| 6,065,460 A | 5/2000 | Lotuaco, III | 124/72 |
| 6,138,656 A | 10/2000 | Rice et al. | 124/73 |
| 6,142,137 A | 11/2000 | MacLaughlin | 124/72 |
| 6,196,504 B1 * | 3/2001 | Lemke | 248/187.1 |
| 6,212,812 B1 | 4/2001 | Aigner | 42/70.06 |
| 6,223,460 B1 | 5/2001 | Schmitter et al. | 42/70.06 |
| 6,256,917 B1 | 7/2001 | Findlay | 42/70.06 |
| 6,260,821 B1 | 7/2001 | Perry et al. | 251/314 |
| 6,311,682 B1 | 11/2001 | Rice et al. | 124/71 |
| 6,349,711 B1 | 2/2002 | Perry et al. | 124/73 |
| D454,685 S | 3/2002 | Parks et al. | D3/254 |
| 6,382,200 B1 | 5/2002 | Levkov | 124/73 |
| D458,333 S | 6/2002 | Power | D22/108 |
| D460,502 S | 7/2002 | Traum et al. | D21/573 |
| 6,439,217 B1 | 8/2002 | Shih | 124/77 |
| 6,474,325 B2 | 11/2002 | Rice et al. | 124/71 |
| 6,474,326 B1 | 11/2002 | Smith et al. | 124/77 |
| 6,494,194 B2 | 12/2002 | Shipachev et al. | 124/73 |
| 6,494,195 B2 | 12/2002 | Perry et al. | 124/84 |
| 6,532,949 B1 | 3/2003 | McKendrick | 124/77 |
| D473,910 S | 4/2003 | Rice et al. | D22/108 |
| 6,550,468 B1 | 4/2003 | Tippmann, Jr. | 124/71 |
| 6,553,983 B1 | 4/2003 | Li | 124/73 |
| 6,578,566 B2 | 6/2003 | Hernandez | 124/73 |
| 6,590,386 B1 | 7/2003 | Williams | 324/178 |
| 6,615,814 B1 | 9/2003 | Rice et al. | 124/71 |
| 6,626,165 B1 | 9/2003 | Bhogal | 124/77 |
| 6,629,379 B1 | 10/2003 | Doiron | 42/70.11 |
| 6,637,420 B2 | 10/2003 | Moritz | 124/73 |
| 6,637,421 B2 | 10/2003 | Smith et al. | 124/77 |
| 6,644,295 B2 | 11/2003 | Jones | 124/77 |
| 6,644,296 B2 | 11/2003 | Gardner, Jr. | 124/77 |
| 6,658,982 B2 | 12/2003 | Cherry | 89/1.42 |
| D484,926 S | 1/2004 | Rice et al. | D21/573 |
| 6,694,963 B1 | 2/2004 | Taylor | 124/32 |
| 6,705,036 B2 | 3/2004 | Orr | 42/69.01 |
| 6,725,852 B1 | 4/2004 | Yokota et al. | 124/49 |
| 6,729,497 B2 | 5/2004 | Rice et al. | 220/835 |
| 6,739,322 B2 | 5/2004 | Rice et al. | 124/49 |
| 6,748,938 B2 | 6/2004 | Rice et al. | 124/77 |
| 6,763,822 B1 | 7/2004 | Styles | 124/77 |
| D496,556 S | 9/2004 | Skrocki et al. | D7/391 |
| 6,802,305 B1 | 10/2004 | Hatcher | 124/31 |
| 6,802,306 B1 | 10/2004 | Rice | 124/74 |
| 6,810,871 B2 | 11/2004 | Jones | 124/77 |
| 6,843,399 B2 | 1/2005 | Garcia | 224/665 |
| 6,948,487 B2 | 9/2005 | Rice et al. | 124/32 |
| 6,973,748 B2 | 12/2005 | Rice | 42/69.01 |
| 7,021,302 B2 | 4/2006 | Neumaster et al. | 124/48 |
| 7,127,845 B2 | 10/2006 | Rice et al. | 42/69.01 |
| 2004/0011344 A1 | 1/2004 | Rice et al. | 124/73 |
| 2005/0103959 A1 * | 5/2005 | Lee | 248/223.41 |
| 2007/0234625 A1 * | 10/2007 | Kidd | 42/111 |

FOREIGN PATENT DOCUMENTS

| | | |
|---|---|---|
| FR | 2801567 | 10/1999 |
| GB | 2252302 | 8/1992 |
| GB | 2370027 | 6/2002 |
| GB | 2391292 | 2/2004 |

* cited by examiner

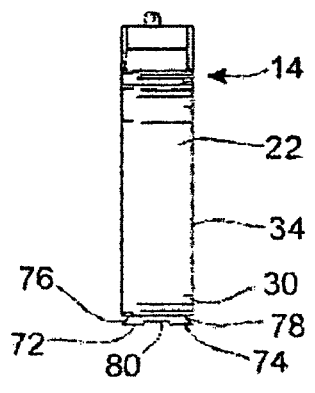
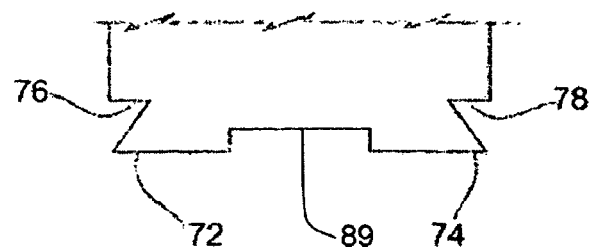
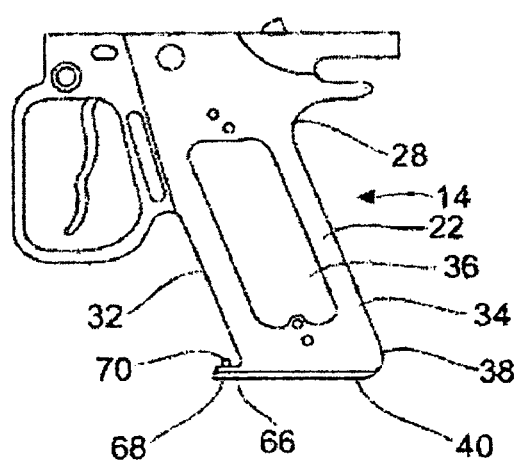
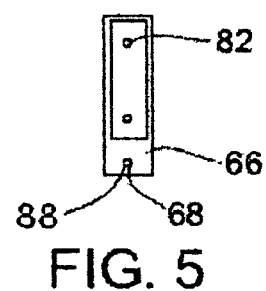

AIR SYSTEM ATTACHMENT ON PAINTBALL MARKER

CROSS-REFERENCE TO RELATED APPLICATIONS

This application claims priority to and is a continuation of U.S. patent application Ser. No. 11/606,302, filed on Nov. 28, 2006, which claims priority to and is a continuation of U.S. patent application Ser. No. 10/815,553, filed on Apr. 1, 2004 now abandoned, which claims priority to and the benefit of U.S. Provisional Patent Application No. 60/459,671 filed Apr. 2, 2003, the content of which are incorporated by reference in their entirety.

FIELD AND BACKGROUND OF THE INVENTION

This invention relates to paintball marker and paintball marker frames. More particularly, the invention relates to a paintball marker frame or other component or part of a paintball marker which is configured to have a special attachment or connector piece received thereon or connected thereto whereby an air system and/or air storage device, typically but not necessarily in the form of an air tank, can be releasably attached to, and removed from, the paintball marker frame or other component or part of a paintball marker.

Paintball markers, also known as paintball guns, are used in the increasingly popular paintball sport for firing paintballs or paint tags. A paintball marker typically comprises a frame, a body containing a number of air passages controlled by valves, a barrel and a paintball magazine. In conventional operations, paintballs will be fed from the paintball magazine into the body, and the pulling of the trigger will release highly compressed air through the passages in such a way so as to provide the necessary force to expel the paintball from the body through the barrel thereof. Most paintball markers derive their power from the use and channeling compressed air to effect discharge of paintballs, and the compressed air is usually carried in special air tanks or canisters which attach to the paintball marker. The tanks are usually physically connected to the paintball marker which will thus support it and pneumatically connected to the passages in the body of the paintball marker, so that the necessary compressed air will be able to flow from the inside of the tanks through the air passages to thereby provide sufficient pneumatic force to expel the paintball, as briefly discussed above.

In order for the air tank or canister to operate properly, it must first be connected to the paintball marker which will thereafter hold it firmly in the desired position relative to the various components. Once this has been done, the appropriate tubes from the air tank need to be connected to the valves or other parts of the paintball marker and thus the airflow pneumatic pathways within the body of the paintball marker so that the compressed air in the tanks can be suitably directed to effect the discharge of the paintball.

It will be appreciated that a fully charged air tank can be of some considerable weight, and it is therefore a benefit to design and construct a paintball marker and air tank such that the air tank is connected easily and efficiently, and also does not significantly upset the balance of the paintball marker. Thus, an ergonomic design of a paintball marker and air tank combination, as well as an efficient and speedy mechanism for easily connecting and disconnecting them from each other, are both important aspects and characteristics of the present invention.

SUMMARY OF THE INVENTION

According to one aspect of the invention, there is provided an attachment for securing an air tank or canister to a paintball marker, the attachment comprising: a first attachment piece formed on the paintball, the first attachment piece having a body portion by means of which it is secured to the paintball marker and a fastening portion; and a second attachment piece having a body portion by means of which it is secured to the air tank and a fastening portion, the fastening portion of the second attachment piece being configured to releasably engage with the fastening portion of the first attachment piece to secure the air tank to the paintball marker. Preferably, the first attachment piece is configured so as to be attachable to the frame of the paintball marker.

The first attachment piece may be a discrete component permanently secured to the paintball marker, or to may be integral with the paintball marker, the body portion of the first attachment piece being an integral portion of the paintball marker.

Preferably, the fastening portion on the first attachment piece comprises at least one rail, and the fastening portion on the second attachment piece comprises a corresponding rail which slidably engages on the rail of the first attachment piece. In one embodiment, the rail on the first attachment piece comprises a dove-tail connection.

Preferably, the first attachment piece and second attachment piece are elongate members, the first attachment piece being configured so as to cover a substantial portion of an underside of a frame on the paintball marker. The corresponding rail on the second attachment portion may comprise a pair of flanges for engaging the dove-tail connection.

The second attachment piece may be a discrete component which can be permanently attached to the air tank, or it may be integral with the air tank, the body portion of the second attachment piece being comprised of the air tank.

The second attachment piece is preferably located on a neck portion of the air tank, the air tank comprising the neck portion and a chamber portion.

Preferably, a tightening member is provided for securing the first attachment piece and the second attachment piece to each other when engaged with each other. The tightening member may comprise a screw formed on the first attachment piece, the screw being manually adjustable to engage the second attachment piece to prevent relative movement between the first attachment piece and the second attachment piece. The tightening member may also comprise a ball-and-detent between the first attachment piece and the second attachment piece, the ball engaging in the detent when the first attachment piece is fully engaged with the second attachment piece.

Preferably, the first attachment piece comprises a plurality of apertures therein, and screws or bolts extend through the apertures and engage with the paintball marker to firmly secure the first attachment piece to the paintball marker.

In one embodiment, the first attachment piece and second attachment piece extend a distance beyond an end of the underside of the frame to form a projecting member. The tightening member may be formed on the projecting member.

According to another aspect of the invention, there is provided an attachment for securing an air tank or canister to a paintball marker, the attachment comprising: a first attachment piece formed on the paintball, the first attachment piece having a fastening portion; and a second attachment piece having a fastening portion, the fastening portion of the second attachment piece being configured to releasably engage with the fastening portion of the first attachment piece to secure the air tank to the paintball marker.

According to yet a further aspect of the invention, there is provided a paintball marker comprising: a body portion; a first attachment piece formed on the body portion, the first attachment piece having a fastening portion; an air tank or canister which can be releasably secured to and removed from the body portion; a second attachment piece formed on the air tank, the second attachment piece having a fastening portion which is configured to releasably engage with the fastening portion of the first attachment piece to releasably secure the air tank to the body.

The fastening portions on the first attachment piece and second attachment piece may comprise a pair of engagable rails.

In one form, the fastening portion on the first attachment piece comprises at least one projection or recess, the projection or recess being received by a corresponding recess or projection formed on the second attachment piece.

According to one aspect of the invention, there is provided a paintball marker, including a frame, the frame having, preferably near the bottom or base thereof, a connecting means by means of which the air tank or canister can be releasably attached to and disengaged from the frame of the paintball marker. In another aspect of the invention, the air tank or canister can be connected to suitable parts or components of the paintball marker other than the frame. Preferably, the connecting means comprises a rail, such as, for example, a dove-tail rail, which in one embodiment may form the base of the frame. The air tank is preferably designed to have a corresponding rail which registers and connects with the rail on the frame, so that the two can be attached, preferably slidably, in relation to each other, in order to achieve operation of the paintball marker.

In another aspect the invention is for a two part connector mechanism for mounting an air tank on the frame or other portion of a paintball marker, the two part connector mechanism having a first component which attaches to or forms part of the frame, and a second component which attaches to the air tank or canister, the first and second components being releasably attachable to each other. A securing device may be provided for enhancing the connection between the first and second components.

BRIEF DESCRIPTION OF THE DRAWINGS

The invention will now be described with reference to the attached drawings, which are as follows:

FIG. 3 is a more detailed view of the frame or body of a paintball maker in accordance with the invention, showing the means for connection;

FIG. 4 is a rear-end view of the frame or body shown in FIG. 3 of the drawings;

FIG. 5 is a bottom view of the frame or body shown in FIG. 3 of the drawings; and FIG. 6 is an enlarged view showing the detail of the dove-tail connecting rail on the bottom side of the frame or body of the paintball marker.

DETAILED DESCRIPTION OF THE INVENTION

Figure 1:
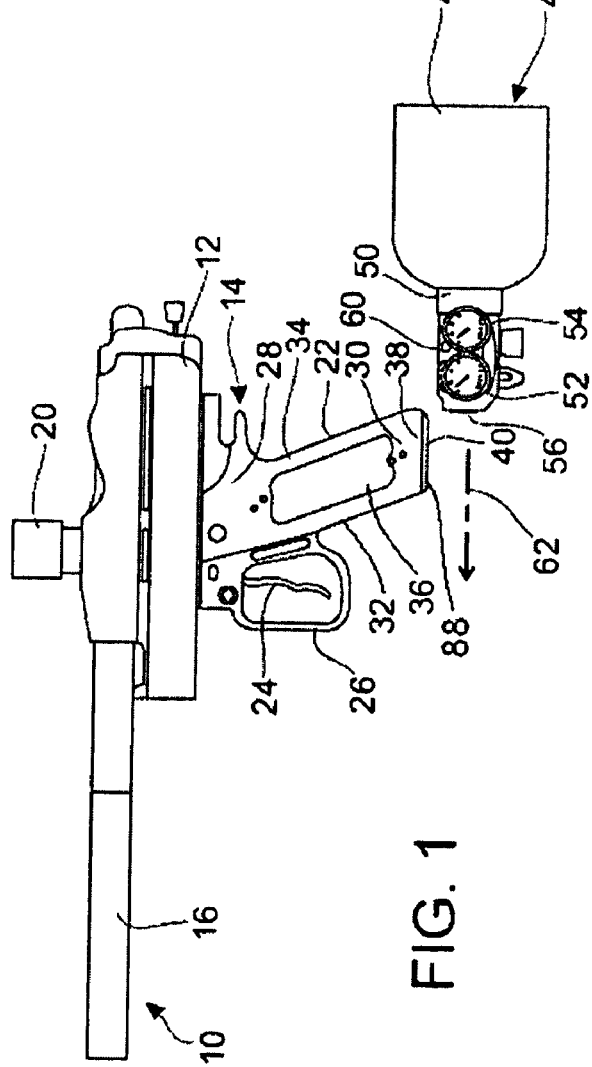
FIG. 1 is a side view of a paintball marker including a frame or body of the invention, shown with an air tank just prior to connection between the paintball marker frame or body and the air tank or canister.

With reference to FIG. 1 of the drawings, there is shown a paintball marker 10 having a body 12, a frame 14, a barrel 16, and a paintball magazine 20. The body 12 may typically comprise a number of valves, rods and pistons, movable block and pneumatic passages, all of which are configured so as to provide the necessary pneumatic thrust for a paintball to be ejected through the barrel 16, and for the subsequent reloading or re-cocking of the paintball marker 10 by allowing for the air controlled transfer of a paintball from the magazine 20 into the body 12. None of these specific components for firing and reloading are specifically relevant to the particular features of the present invention, and will not, therefore, be described in further detail in this specification.

The frame 14 includes a handle 22, a trigger 24 and trigger guard 26. The trigger 24 itself connects to various components to effect firing and reloading of the paintball marker 10, but these, too, are not for the most part germane to the present invention and will not be discussed further.

The handle 22 comprises an upper member 28, a lower member 30, and side members 32 and 34, all of which define an opening 36. The lower member 30 comprises a base 38 which, in the embodiment shown in the drawings, has attached thereto a dove-tail rail 40. This will be described in further detail below. While the specific embodiment shown in the Figures relates to a dove-tail rail, it should be appreciated that any other type of rail or connecting mechanism, as will be described, may be used. It should therefore be understood that the invention is not limited to a dove-tail rail, which only constitutes one of the preferred embodiments. Further, and as will be mentioned below, the rail 40 may be either an add on component to the handle 22 on an existing paintball marker or it may be configured in the manufacturing or building process as part of the handle 22.

In order to be operational, a paintball marker 10 is connected to an air tank 46 or some kind of canister for containing air under pressure, referred to hereinafter generally as an air tank. The air tank 46 has a body 48 defining a chamber in which compressed air is contained, and a neck 50. The neck 50 includes gauges 52 and 54, and an outlet 56 which connects to a tube (not shown) (or any other structure which is capable of conveying air under pressure to the desired locations) and which ultimately is placed in communication with the pneumatic pathways within the body 12 of the paintball marker 10, referred to briefly above.

Figure 2:
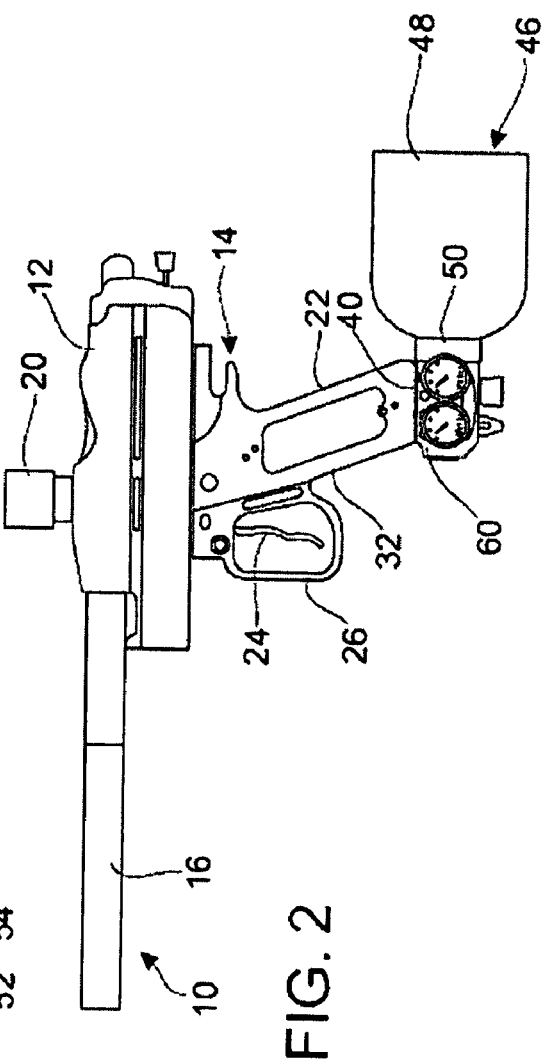
FIG. 2 is a side view of a paintball marker with frame or body as shown in FIG. 1 of the drawings, wherein the air tank is connected to the frame or body.

Along at least a portion of the length of the neck 50 is a rail 60. The rail 60 is configured and designed so as to be slidably received on the dove-tail rail 40. Therefore, by moving the air tank 46 in the direction of arrow 62 shown in FIG. 1 of the drawings, the dove-tail rail 40 and the rail 60 will engage one another, thereby connecting the air tank 46 to the frame 14 of the paintball marker 10. FIG. 2 of the drawings shows the air tank 46 in the attached position with respect to the frame 14. Note that, in the embodiment shown, the air tank 46 is merely physically attached to the frame 14 by the rails 40 and 60, but not pneumatically connected thereby. Thus, the appropriate air tubing connections must be made between the air tank 46 and the body 12, to provide the effect described above. The air tank 46 is preferably connected to the frame 14 by means of the dove-tail rail 40 and the rail 60, as described, in a firm but releasable manner so that the user can attach and remove the air tank 46, as the air under pressure in one tank is consumed and it becomes necessary to replace it with another.

While in many instances the connection of the dove-tail rail 40 to the rail 60 on the air tank 46 may be sufficiently secure to establish a strong connection between these two components, fastening means may be provided to prevent inadvertent disconnection of the air tank 46 from the frame 14 due to a knock, dropping of the paintball marker 10, or some such other event. Such fastening means may comprise a set screw, ball and detent arrangement 88, or any other mechanism for enhancing contact between the frame 14 and the air tank 46. It should, of course, be remembered that the connection of the air tank 46 to the frame 14 is not a permanent one, but is intended to be easily releasable so that prior or during the paintball game a used air tank 46 can be quickly removed and replaced with a refill air tank 46 in an effective and expeditious manner.

Reference is now made to the more detailed Figures showing some of the components of the invention. In FIG. 3, the frame 14 can be seen as comprising the upper member 28, lower member 30, the side walls 32 and 34, all of which define the handle 22, and the opening 36 therein. The base 38 of the lower member 30 has attached thereto the rail 40. It will be seen in FIG. 3 that the rail 40 extends a short distance beyond side member 32 so as to have a projecting portion 66, the projecting portion 66 including an aperture 68 in which is received a set screw 70. The set screw 70, adjustable within the aperture 68, is intended to illustrate one mechanism in this embodiment shown in the Figures to secure the air tank 46 relative to the frame 14.

When the rail 60 of the air tank 46 has been engaged with the rail 40 of the frame 14, as shown in FIG. 2 of the drawings, the set screw 70 is tightened. The set screw 70 may have various effects upon the connection between the air tank 46 and handle 22, to enhance the force of the connection there between. Thus, for example, the set screw 70 may push the rail 60 on the air tank 46 away from the rail 40. This would make it more difficult to slide the rail 60 over the dove-tail rail 40. In another embodiment, the set screw 70 may have the effect of pulling the rail 60 on the air tank 46 into closer engagement with the dove-tail rail 40, once more having the same effect of enhancing the connection between these two components. It may also be possible that the rail 60 on the air tank 46 may have a notch, a groove or other feature so as to receive the set screw 70 when it is tightened within the aperture 68, so that the rails 40 and 60 respectively are neither pulled together not pushed apart, but their relative movement is prevented by the end of the set screw 70 being located within the detent or recess on the rail 60.

FIG. 4 shows a rear view of the frame 14, while FIG. 6 shows a detail of the lower end, clearly illustrating the dove-tail arrangement of the rail. The dove-tail rail 40 comprises a pair of outwardly depending skirts or projections 72 and 74, each of which forms a slot or rail 76 and 78 respectively, with respect to the lower portion 30 of the frame 14. The dove-tail 40, at its exposed end, has a rectangular recess 80, which may receive a corresponding projection 89 on the rail 60, on the air tank 46.

In use, the rail 60 on the air tank 46 has a pair of 20 lateral inwardly projecting flanges (not shown in the drawings) which engage within the recessed slots or rails 76 and 78, so as to slide relative thereto.

FIG. 5 of the drawings shows a bottom view of the dove-tail rail 40. As will be seen, the dove-tail rail 40 includes apertures 82 by means of which the dove-tail rail 40 can be secured to the lower portion 30 of the handle 22. The projecting portion 66 includes the aperture 68, through which the set screw 70 can be tightened of loosened so as to enhance the engagement with the rail 60 on the air tank 46, as has already been described.

The invention is not limited to the precise details mentioned above. For example, it is emphasized that the dove-tail rail 40 and corresponding flanges on the rail 60 are just one form or embodiment of the invention by means of which the air tank 46 can be releasably attached to the lower portion 30 of the frame 14. However, any suitable mechanism for which facilitates an easy fastening and release connection between these components would serve equally well to achieve the purposes of the invention.

In a preferred embodiment, the dove-tail 40 consists of a ⅜ inch dove-tail rail which is built into the frame. It will be appreciated that the dove-tail 40 can either be constructed into the lower portion of the frame 14, or in fact can be an add-on piece with the dove-tail 40, so that existing frames 14 can be adapted to have an appropriate rail 40 for connection to the air tank 46.

The weight and positioning of the air tank 46 relative to the frame 14 provides a beneficial ergonomic effect, and a good balance of the paintball marker 10 can be achieved. With respect to the dove-tail rail 40, this is, in one embodiment, as shown in FIG. 6, set at an angle of 300, and has a height of 0.095 inches. In a preferred embodiment, the recess 80 is 0.188 inches wide, and 0.035 inches deep. The width of the frame 14, in a preferred embodiment, is 0.540 inches, while the width between the interior part of the dove-tail is 0.430 inches. All of these measurements provided are intended to reflect a preferred embodiment, but any suitable dimension and, indeed, other type of rail or form of connection, as mentioned above, can be used, in order to secure attachment of the air tank to the frame 14.

The invention should be broadly interpreted to comprise any two part connector mechanism, having first and second components which are separable from and releasably connectable to each other, the first component being affixed to the frame of a paintball marker or another portion thereof, and the second component being attached to the air tank.

The invention claimed is:

1. An attachment for ergonomically securing an air tank or canister to the frame a paintball marker, the attachment comprising:
    a dove-tail rail formed on an underside of the frame of the paintball marker, said dove-tail rail having:
        a body portion by means of which it is secured to the paintball marker;
        a pair of outward projections extending from said body portion at an angle; and
        a rectangular recess positioned between said pair of outward projections;
    a rail having a body portion by means of which it is secured to the air tank, said rail engaging said pair of outward projections and said rectangular recess to secure the air tank to the frame of the paintball marker; and
    a ball-and-detent structure releasably securing said dove-tail rail and said rail to each other when engaged with each other, said ball-and-detent structure having a ball engaging in a detent when said dove-tail rail is fully engaged with said rail, said ball-and-detent structure providing a tightening arrangement between said dove-tail rail and said rail which may be released without the use of tools.

2. An attachment as claimed in claim 1 wherein said dove-tail rail and said rail are elongate members, said dove-tail rail being configured so as to cover a substantial portion of an underside of the frame on the paintball marker.

3. An attachment as claimed in claim 1 wherein said rail is integral with the air tank, the body portion of said rail being comprised of the air tank.

4. An attachment as claimed in claim 1 wherein said rail is located on a neck portion of the air tank, the air tank comprising the neck portion and a chamber portion.

5. An attachment as claimed in claim 1 wherein said dove-tail rail and said rail extend a distance beyond an end of the underside of the frame to form a projecting member.

6. A paintball marker comprising:
- a frame;
- an air tank or canister;
- a dove-tail rail formed on an underside of said frame of the paintball marker, said dove-tail rail having:
  - a body portion by means of which it is secured to the paintball marker;
  - a pair of outward projections extending from said body portion at an angle; and
  - a rectangular recess positioned between said pair of outward projections;
- a rail having a body portion formed on a neck of said air tank, said rail engaging said pair of outward projections and said rectangular recess to secure said air tank to said frame of the paintball marker; and
- a ball-and-detent structure releasably securing said dove-tail rail and said rail to each other when engaged with each other, said ball-and-detent structure having a ball engaging in a detent when said dove-tail rail is fully engaged with said rail, said ball-and-detent structure providing a tightening arrangement between said dove-tail rail and said rail which may be released without the use of tools.

* * * * *